United States Patent
Turatti

(10) Patent No.: US 8,082,931 B2
(45) Date of Patent: Dec. 27, 2011

(54) APPARATUS FOR WASHING AND DRYING LEAF PRODUCTS AND MORE GENERICALLY VEGETABLES

(75) Inventor: Antonio Turatti, Cavabzere (IT)

(73) Assignee: Turatti S.r.l., Venezia (IT)

( * ) Notice: Subject to any disclaimer, the term of this patent is extended or adjusted under 35 U.S.C. 154(b) by 79 days.

(21) Appl. No.: 12/433,357

(22) Filed: Apr. 30, 2009

(65) Prior Publication Data

US 2009/0272408 A1 Nov. 5, 2009

(30) Foreign Application Priority Data

May 5, 2008 (IT) .............................. RM2008A0234

(51) Int. Cl.
 *B08B 3/00* (2006.01)
 *A01K 43/00* (2006.01)
 *A23N 12/00* (2006.01)

(52) U.S. Cl. ............. 134/119; 15/3.1; 15/3.11; 15/3.12; 15/3.13; 15/3.14; 15/3.15; 15/3.16; 15/3.17; 15/3.18; 15/3.19; 15/3.2; 15/3.21; 134/25.3

(58) Field of Classification Search .................. None
See application file for complete search history.

(56) References Cited

U.S. PATENT DOCUMENTS

| | | | |
|---|---|---|---|
| 1,973,767 A * | 9/1934 | Kimball et al. ............... | 414/414 |
| 2,312,829 A * | 3/1943 | Bird et al. ...................... | 210/781 |
| 3,279,635 A * | 10/1966 | Avery et al. .................... | 414/420 |
| 3,456,659 A * | 7/1969 | Tiby .............................. | 134/153 |
| 4,101,285 A * | 7/1978 | Tilby .............................. | 422/276 |
| 5,307,567 A * | 5/1994 | Schnake et al. ................. | 34/319 |
| 2003/0079761 A1 * | 5/2003 | Rich ............................. | 134/25.3 |

* cited by examiner

*Primary Examiner* — Michael Barr
*Assistant Examiner* — Jason Ko
(74) *Attorney, Agent, or Firm* — Gesmer Updegrove LLP

(57) ABSTRACT

The invention relates to an apparatus (1) for washing and drying leaf products and more generically vegetables, comprising a frame (2), a centrifugation basket (3), a container (tank) (4) within which said centrifugation basket (3) is provided, a basin (6), communicating with said container (4) for inlet and discharge of washing water, said centrifugation basket (3) being pivoted on said frame (2) so as to rotate of about 180° from a working position to a discharge position, and vice versa, and means (7) for collection and removal of washed and dried product, said means being provided raised with respect to said centrifugation basket (3), in a position corresponding to the discharge position of the same centrifugation basket (3), being further provided driving means for said centrifugation basket permitting driving said basket (3) at at least two rotation speeds, respectively a washing speed and a drying speed.

5 Claims, 3 Drawing Sheets

APPARATUS FOR WASHING AND DRYING LEAF PRODUCTS AND MORE GENERICALLY VEGETABLES

PRIORITY INFORMATION

The present application claims priority to Italian Patent Application No. RM2008A000234, filed on May 5, 2008, all of which is incorporated herein in its entirety.

BACKGROUND OF THE INVENTION

The present invention relates to an apparatus for washing and drying leaf products and more generically vegetables.

More specifically, the invention concerns an apparatus of the above kind permitting washing and drying the above mentioned products within a single apparatus, with a remarkable saving as far as costs, power and dimensions are concerned, thus remarkably increasing quality of the product obtained.

As it is well known, washing and drying steps are usually provided during processing of leaf products and more generically of vegetables. Different apparatuses are presently available to this end.

In any case, usually, in these systems a washing apparatus is provided, conveyor belts being provided downward said washing apparatus for transferring washed products to the drying apparatus, usually a centrifugal apparatus.

However, these apparatuses are very high, since they provide loading from the above and discharge from below.

In order to integrate this kind of centrifugal machine within a system for washing and drying leaf products and like, it is necessary providing a series of elevator conveyor belts taking the product from the exit of the washing apparatus at the centrifugal machine loading height. As a first consequence, it is necessary realizing a much more large system, since at least two conveyor belts for raising the product are necessary.

Furthermore, it is known that presence of elevating conveyor belts, working continuously, have a remarkable environmental impact.

In this context is included the solution according to the present invention, permitting realizing a system for washing and drying leaf products and more generically vegetables by a single apparatus in order to carry out two steps, thus obtaining remarkable advantages with respect to costs, power saving and dimensions.

SUMMARY OF THE INVENTION

It is therefore specific object of the present invention an apparatus for washing and drying leaf products and more generically vegetables, comprising a frame, a centrifugation basket, a container (tank) within which said centrifugation basket is provided, a basin, communicating with said container for inlet and discharge of washing water, said centrifugation basket being pivoted on said frame so as to rotate of about 180° from a working position to a discharge position, and vice versa, and means for collection and removal of washed and dried product, said means being provided raised with respect to said centrifugation basket, in a position corresponding to the discharge position of the same centrifugation basket, being further provided driving means for said centrifugation basket permitting driving said basket at at least two rotation speeds, respectively a washing speed and a drying speed.

Preferably, according to the invention, said centrifugation basket is supplied from above.

Still according to the invention, said means for collection and removal of the dried product are comprised of a conveyor belt.

Always according to the invention, said upturning action can be a manual action and/or a motorized action.

Still according to the invention, said centrifugation basket is rotated by an electric motor.

The invention further relates to a process for washing and drying leaf products and more generically vegetables, comprising the steps of:
- loading the product to be washed and dried within a centrifugation basket;
- filling in with a washing liquid a container containing said centrifugation basket;
- rotating at a first rotation speed said centrifugation basket for a time sufficient to wash said product;
- discharging said washing liquid from said container;
- rotating at a second rotation speed said centrifugation basket for a time sufficient to dry said product;
- upturning said centrifugation basket of about 180° with respect to the horizontal plane and discharging the product on a conveyor belt.

BRIEF DESCRIPTION OF THE DRAWINGS

The present invention will be now described, for illustrative but not limitative purposes, according to its preferred embodiments, with particular reference to the figures of the enclosed drawings, wherein.

DETAILED DESCRIPTION OF THE INVENTION

Figure 1:
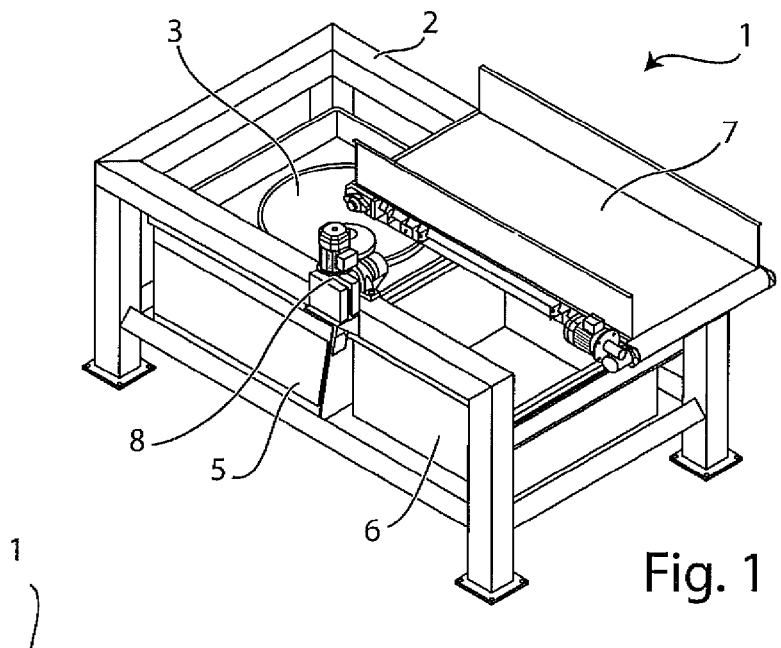
FIG. 1 is a perspective view of an apparatus according to the invention in a working position.
Figure 2:
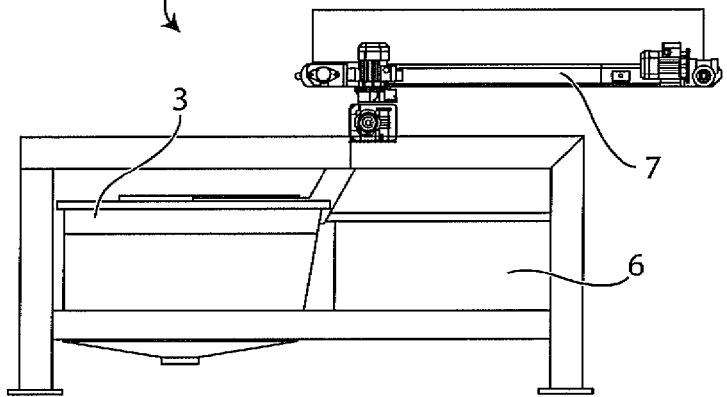
FIG. 2 is a lateral view of apparatus of FIG. 1.
Figure 3:
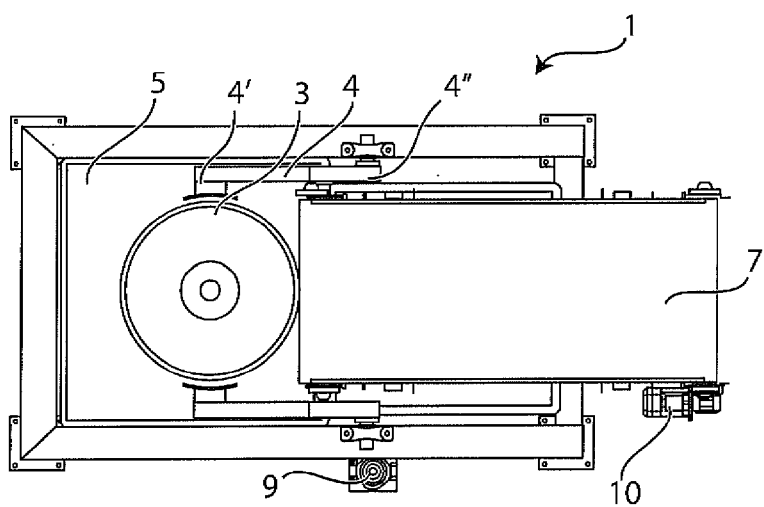
FIG. 3 is a top view of apparatus of FIG. 1.
Figure 4:
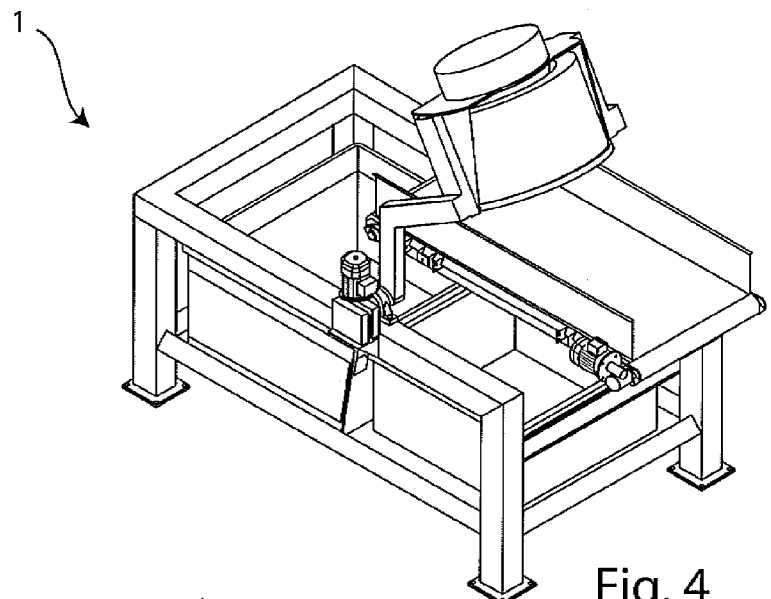
FIG. 4 is a perspective view of an apparatus according to the invention in a discharging position.

Making reference to the figures of the enclosed drawings, and first at FIGS. 1-3, it is shown an apparatus according to the invention, generically indicted by reference number 1, for washing and drying leaf products and more generically vegetables.

Supply of products to be washed and dried to the apparatus 1 is from above (supply system is not shown since it is not integral part of the invention).

Apparatus 1 according to the invention provides a frame 2, a washing tank and a centrifugation basket 3, supported by two arms 4, each one having a end (4') laterally fixed to said centrifugation basket 3, and one end (4") pivoted on said frame 2. Said basket 3 is contained within a container 5.

A basin (tank) 6 for collecting washing water is provided laterally with respect to said basket 3, said basin 6 being connected with basket 3 by a recirculation system (not shown).

A conveyor belt 7 is provided laterally and raised with respect to said centrifugation basket 3, for collection of washed and dried products.

It is further possible observing from figures motors 8, 9 and 10, respectively driving centrifugation basket 3, upturning of arms 4 and motion of belt 7.

After having loaded material within basket 3 from above, container (tank) 5 is filled in with suitable water for washing, and centrifugal machine is actuated, making basket 3 rotating at the suitable speed to obtain washing (lower speed with respect to the drying step).

Thus, water is taken from container 5 by said means (not shown) connecting container 5 and basin 6, and centrifugal machine is actuated at a suitable speed to obtain drying of the product (speed higher with respect to the washing step).

Figure 5:
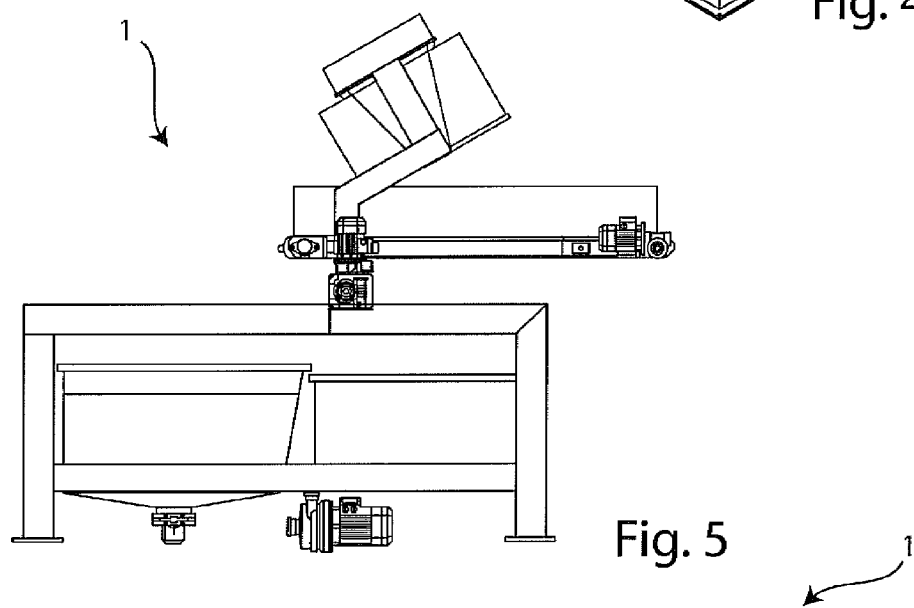
FIG. 5 is a lateral view of apparatus of FIG. 4.
Figure 6:
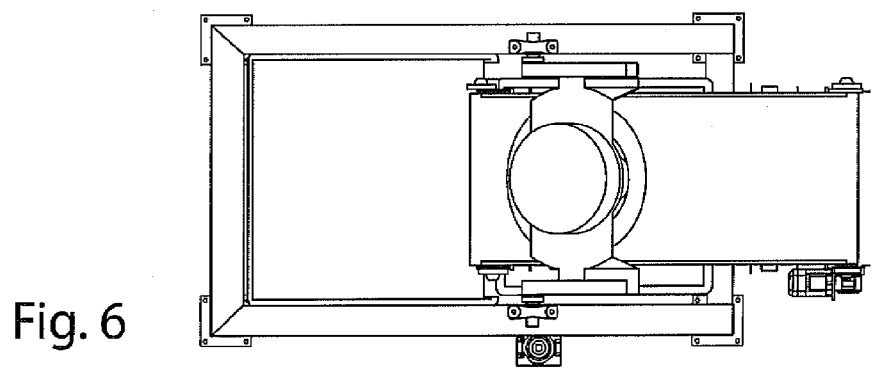
FIG. 6 is a top view of apparatus of FIG. 4.
Figure 7:
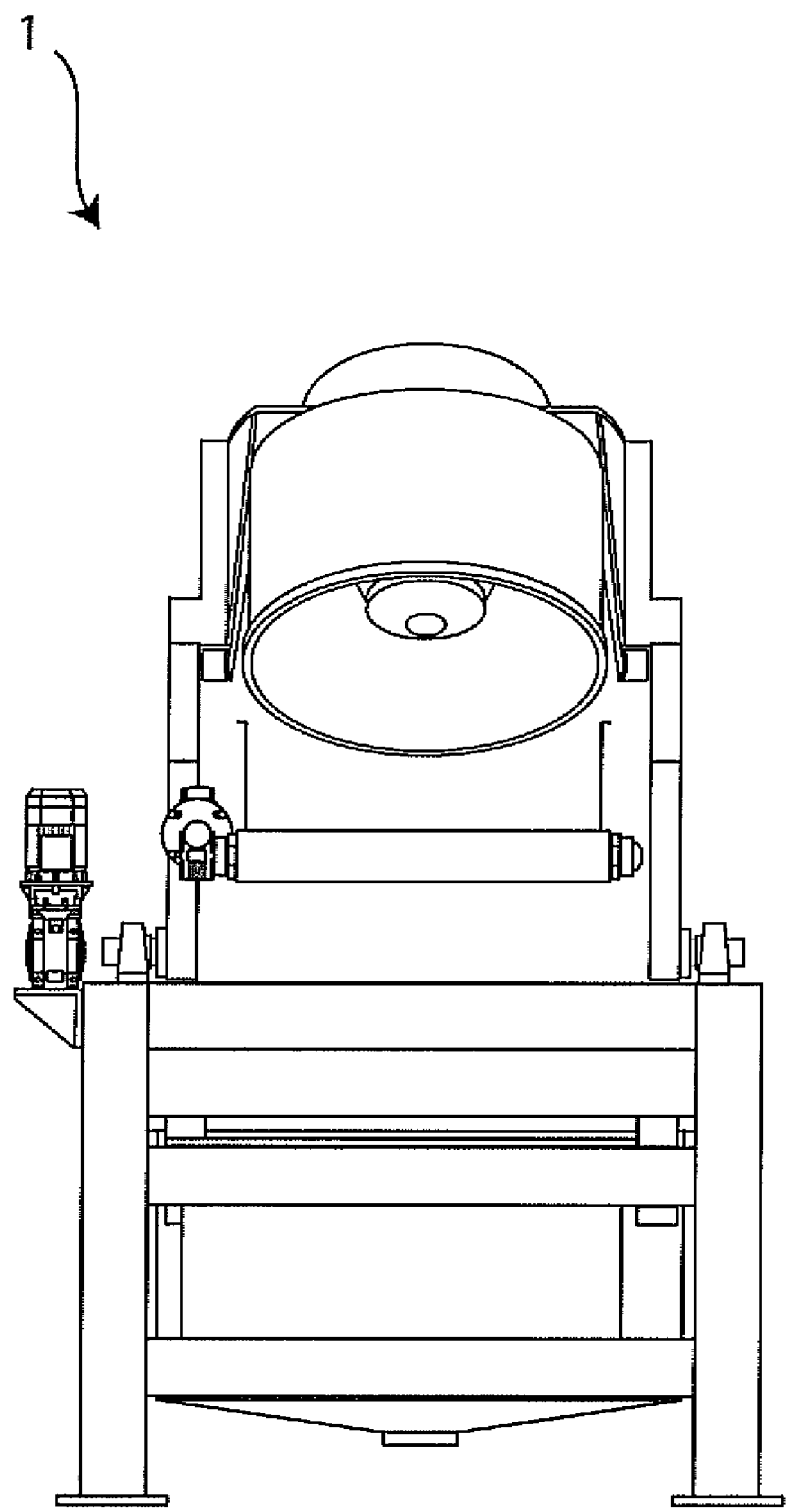
FIG. 7 is a front view of apparatus of FIG. 4.

Once terminated drying (see FIGS. 4-7), arms 4 are actuated, making them rotating about pins 4" (FIG. 5) discharging washed and dried product on the conveyor belt 7, to transfer the same to the following working steps.

It is well evident that the solution suggested according to the invention permits obtaining exceptional results with respect to known solutions, as far as costs (remarkable reduction of elements provided in the system to carry out the same operations), managing and system costs, ecologic aspects, eliminating a remarkable number of continuously moving elements, such as conveyor and elevator belts, are concerned, remarkably increasing quality of the product, also in view of the fact that a lower number of working steps is provided.

The present invention has been described for illustrative but not limitative purposes, according to its preferred embodiments, but it is to be understood that modifications and/or changes can be introduced by those skilled in the art without departing from the relevant scope as defined in the enclosed claims.

What is now claimed:

1. An apparatus for washing and drying leaf products and more generically vegetables, characterized in that it comprises a frame, a centrifugation basket, a container (tank) within which said centrifugation basket is provided, a basin, communicating with said container for inlet and discharge of washing water, said centrifugation basket being pivoted on said frame so as to rotate of about 180° from a working position to a discharge position, and vice versa, and means for collection and removal of washed and dried product, said means being provided raised with respect to said centrifugation basket, in a position corresponding to the discharge position of the same centrifugation basket, being further provided driving means for said centrifugation basket permitting driving said basket at least two rotation speeds, respectively a washing speed and a drying speed.

2. The apparatus according to claim 1, wherein said centrifugation basket is supplied from above.

3. The apparatus according to claim 1, wherein said means for collection and removal of the dried product are comprised of a conveyor belt.

4. The apparatus according to claim 1, wherein the rotation of the centrifugation basket from a working position to a discharge position and vice versa is a manual action and/or a motorized action.

5. The apparatus according to claim 1, wherein said centrifugation basket is rotated by an electric motor.

* * * * *